N. W. STORER.
CONTROL SYSTEM FOR ELECTRIC MOTORS.
APPLICATION FILED JUNE 18, 1913.
1,239,840.
Patented Sept. 11, 1917.
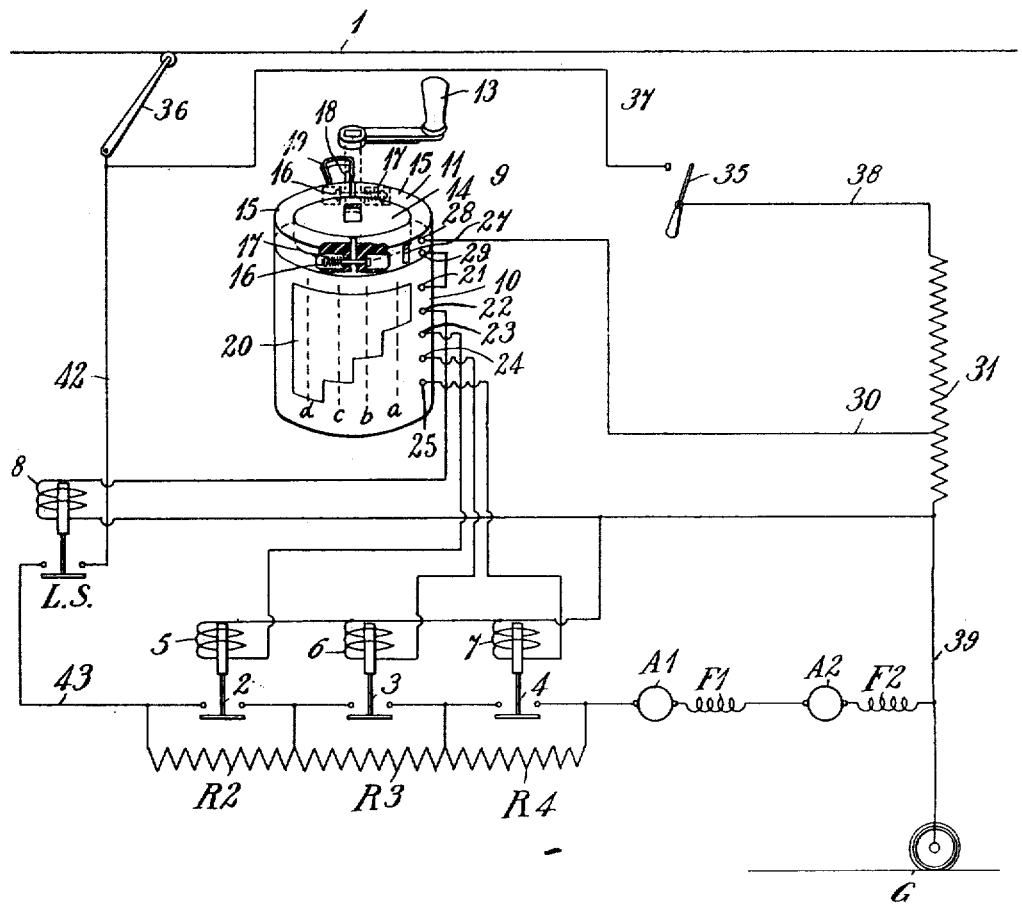
WITNESSES:
Fred H Miller
D. W. Mace
INVENTOR
Norman W. Storer
BY
Wesley G. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR ELECTRIC MOTORS.

1,239,840.  Specification of Letters Patent.  Patented Sept. 11, 1917.

Application filed June 18, 1913. Serial No. 774,394.

*To all whom it may concern:*

Be it known that I, NORMAN W. STORER, a citizen of the United States, and a resident of Pittsburgh, in the county of Allegheny and State of Pennsylvania, have invented a new and useful Improvement in Control Systems for Electric Motors, of which the following is a specification.

My invention relates to systems of control for electric motors and particularly to such systems as are adapted for the control of railway or vehicle motors and embody a plurality of independent unit switches and a master controller.

The object of my invention is to provide a system of the above indicated character which shall embody simple and effective means for concurrently interrupting the energizing circuits of all of the unit switches in case the master controller is moved backward a predetermined amount.

Master controllers are usually arranged to complete the energizing circuits of the several unit switches in a predetermined sequence when moved in a forward direction in order to properly govern the motors during the period of acceleration, and are also adapted to interrupt the energizing circuits in the reverse order when moved backward to their off positions.

According to my invention, I propose to provide a master controller with an auxiliary member or disk which has a frictional engagement with the main drum of the controller and which is adapted, by means of suitable stops, to be restricted in its movement through a predetermined angle, preferably corresponding to a single notch, whereby the main control circuit, which is interlocked with a contact member of the frictional driven member, is completed in the first position of the master controller and remains so during the rest of the operation, so long as the controller is moved in the forward direction, but is interrupted immediately when the controller is moved backward, even a single notch.

The single figure of the accompanying drawing is a diagrammatic view of the circuit connections of a system and controller embodying my invention.

Referring to the drawing, a supply circuit 1, receiving energy from any suitable source (not shown), and having a return circuit G, is adapted to deliver energy to a plurality of electric motors having armatures $A^1$ and $A^2$ and field windings $F^1$ and $F^2$ through a line switch LS and a plurality of electrically controlled resistance-governing switches 2, 3 and 4 which are adapted to respectively short circuit resistors $R^2$, $R^3$ and $R^4$.

The several switches 2, 3, 4 and LS are operated directly by means of suitable electro-magnets 5, 6, 7 and 8 although it is evident that they may conveniently be of any well known electro-magnetic type in which the several magnets are employed for governing the operation of the actuating pistons.

The several energizing circuits for said switches are arranged and governed by means of a master controller 9 comprising a main rotatable drum 10 and an auxiliary disk or member 11, the main drum 10 being provided with an operating handle 13 of the usual type. Moreover, the main drum 10 embodies an upwardly projecting cylindrical portion 14 of somewhat smaller diameter than the main body portion, around which the auxiliary disk member 11 is disposed. The member 11 comprises two similar half units 15 which are resiliently held together on opposite sides by means of suitable bolts 16 and springs 17, whereby a frictional engagement between the disk member 11 and the portion 14 of the drum 10 is effected. The frictional resistance between the several members 14 and 11 may be readily adjusted to any desired value by means of the bolts 16, as will be readily understood.

In order to limit the rotational movement of the frictional driven disk member 11, a projecting member 18 is provided which is adapted to engage the arms of a U-shaped stop 19 when moved in either direction and thus restrict the movement to a sector which corresponds to a single notch of the controller.

The main drum 10 is provided with a conducting segment 20 adapted to engage stationary contact terminals 21, 22, 23, 24 and 25 along the position-indicating lines *a*, *b*, *c* and *d*, whereby the energizing circuits for the several electrically controlled switches LS, 2, 3 and 4 are established in the other mentioned positions of the master controller.

The auxiliary disk 11 preferably is composed of suitable insulating material and is provided with a conducting contact member 27 which is adapted to bridge a plurality of stationary contact terminals 28 and 29 in the first running position $a$ and thus to complete a main control circuit between the main drum 10 of the controller and a tap 30 intermediate a control resistor 31 which is connected between the supply circuit 1 and the return circuit G through a hand-operated switch 35.

Assuming the apparatus and the connections to occupy the positions shown in the figure, the driving motors may be started as follows:

The switch 35 is first closed, thereby completing a circuit from the supply circuit conductor 1 through traveling collector 36, conductor 37, switch 35, conductor 38, resistor 31 and conductor 39 to the return circuit G. Thus, the full line voltage is impressed upon the resistor 31 and a reduced voltage is impressed on contact terminal 28 of the master controller through conductor 30.

If the main drum 10 of the master controller 9 be moved by the handle 13 into position $a$, the auxiliary disk 11 and its contact member 27 will be moved with the main conducting segment 20, by reason of the frictional engagement between the members 11 and 10, until the movement is stopped by the engagement of the stop 19 with the engaging member 18. In this position, contact member 27 bridges the contact terminals 28 and 29 and the conducting segment 20 bridges the contact terminals 21 and 22, thereby completing a circuit through the energizing coil of electro-magnet 8 to the return circuit G. The switch LS is thus closed, and energy is supplied to the driving motors through collector 36, conductor 42, switch LS, conductor 43, resistors $R^2$, $R^3$ and $R^4$, armature $A^1$, field winding $F^1$, armature $A^2$, field winding $F^2$ and conductor 39 to the return circuit G. The driving motors are thus caused to accelerate in accordance with well-known principles.

In order to further accelerate the motors, the master controller 9 will be moved successively into positions $b$, $c$ and $d$, in which the switches 2, 3 and 4 are successively closed to short circuit the resistors $R^2$, $R^3$ and $R^4$.

It will be noted that, after the auxiliary disk 11 has been moved to position $a$, no further movement thereof is possible in a forward direction and the conducting segment 20 is moved into its other positions independently thereof. Obviously, the contact member 27 bridges the contact terminals 28 and 29 and thus supplies energy to the main contact terminal 21 so long as the controller 9 is moved in a forward direction. It is not considered necessary to describe the circuits which are completed in the several positions $b$, $c$, and $d$, nor the operation of the other apparatus, as those familiar with the art will have no difficulty in tracing the circuits and understanding the operation of the system.

If the master controller 9 be moved from any of its operating positions in a reversed direction, the frictional engagement between the main drum 10 carrying the conducting segment 20, and the auxiliary disk 11, causes said disk to be moved with the main drum until the stop 19 engages member 18. It is evident, therefore, that the main control circuit between the contact terminals 28 and 29 is immediately interrupted, thereby deënergizing all of the operating electromagnets 5, 6, 7 and 8 and opening all of the switches 2, 3, 4 and LS simultaneously.

Although, I have described my invention and illustrated it in connection with apparatus and a control system of a very simple nature, it will be understood that my invention is not in any sense restricted to the particular structure or connections set forth and that various modifications therein may be effected without departing from the spirit and scope of my invention.

I claim as my invention:

1. In a control system, the combination with electric translating means, and a plurality of electrically controlled switches for governing the operation thereof, of a master controller for controlling the operation of said switches and comprising a main contact-bearing drum adapted to govern the circuits of said switches, a frictionally driven auxiliary member having contact members adapted to govern the main energizing control circuit, and means for limiting the movement of said auxiliary member.

2. A control system comprising an electric translating device, control means therefor, and a master controller adapted to occupy a plurality of positions for governing the control means and comprising a main contact-bearing drum, an auxiliary member, a friction coupling operatively connecting said main drum and said member, and means for limiting the rotative movement of said member, whereby any predetermined backward movement of the drum returns the member to its initial position.

3. A control system comprising an electric translating device, control means therefor, a master controller for governing the control means and comprising a movable contact-bearing member embodying a main section, an auxiliary section, a friction clutch connection for operatively connecting said sections, a plurality of stationary contact terminals, and a movable contact member on the auxiliary section adapted to engage two of the stationary contact terminals as the master controller is rotated forwardly and adapted to become disengaged from said terminals when the main section is moved backwardly.

4. A control system comprising an electric translating device, control means therefor, a master controller for governing the control means and comprising a movable contact-bearing member having a main section, an auxiliary section, a friction clutch operatively connecting said sections, a plurality of stationary contact terminals, and a movable contact member on the auxiliary section adapted to engage two of the stationary contact terminals as the master controller is rotated forwardly and adapted to become disengaged from said terminals when the main section is moved backwardly, the contact member associated with the auxiliary section being adapted to govern the completion of the translating device circuit.

5. In a control system, the combination with a motor and a supply circuit, a line switch and a plurality of independently actuated resistor-switches for connecting the motor to the supply circuit and governing the acceleration thereof, and a controller for governing the operation of said switches and embodying means for causing the opening of said line switch if moved backward a predetermined slight amount.

6. In a control system, the combination with an electric translating device and a plurality of electrically controlled switches for governing the operation thereof, of a master controller for governing the operation of said switches and comprising means for controlling the independent energizing circuits of the respective switches and means actuated by said first means for governing the main energizing control circuit of all of said switches.

7. In a control system, the combination with electric translating means, control means therefor, and a master controller adapted to occupy a plurality of positions for governing said control means and comprising a main contact-bearing drum and auxiliary means operatively associated therewith and actuated thereby, and means for limiting the actuation of said auxiliary means.

8. In a control system, the combination with electric translating means, and electrical control means therefor, of a master controller for governing the energizing circuits of said electrical control means and comprising a main contact-bearing member, stationary contact terminals coöperating therewith, an auxiliary movable contact member adapted to be actuated to a limited degree in both forward and reverse directions by said main contact-bearing member in accordance with its movement, and stationary contact terminals adapted to coöperatively engage said auxiliary movable contact member under predetermined conditions to control the energization of said electrical control means.

In testimony whereof, I have hereunto subscribed my name this 7th day of June 1913.

NORMAN W. STORER.

Witnesses:
D. C. HERSHBERGER,
B. B. HINES.

Copies of this patent may be obtained for five cents each, by addressing the "Commissioner of Patents, Washington, D. C."